W. LAMB.

Log Carriage for Saw Mills.

No. 8,150. Reissued April 2, 1878.

WITNESSES:

W. W. Hollingsworth

Solon C. Kemon

INVENTOR:

Willard Lamb

BY

Munn & Co.

ATTORNEYS.

N. PETERS, PHOTO-LITHOGRAPHER, WASHINGTON, D. C.

UNITED STATES PATENT OFFICE.

WILLARD LAMB, OF GREEN BAY, WISCONSIN.

IMPROVEMENT IN LOG-CARRIAGES FOR SAW-MILLS.

Specification forming part of Letters Patent No. 132,086, dated October 8, 1872; Reissue No. 8,150, dated April 2, 1878; application filed February 28, 1878.

*To all whom it may concern:*

Be it known that I, WILLARD LAMB, of Green Bay, in the county of Brown and State of Wisconsin, have invented a new and useful Improvement in Log-Carriages for Saw-Mills; and I do hereby declare that the following is a full, clear, and exact description of the same.

My invention is an improvement in the class of saw-mills whose log-carriages are fed to the saw by means of a rope or chain attached to the respective ends of the log-carriage and wound about a rotary drum.

The invention relates to the construction and arrangement of parts, as hereinafter described and claimed.

Figure 1:
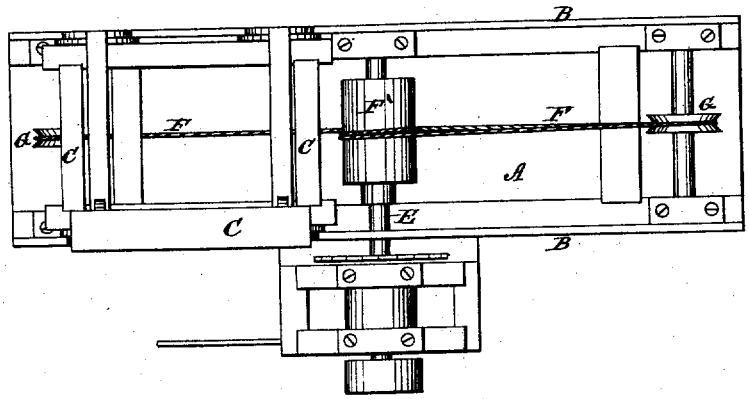
Figure 2:
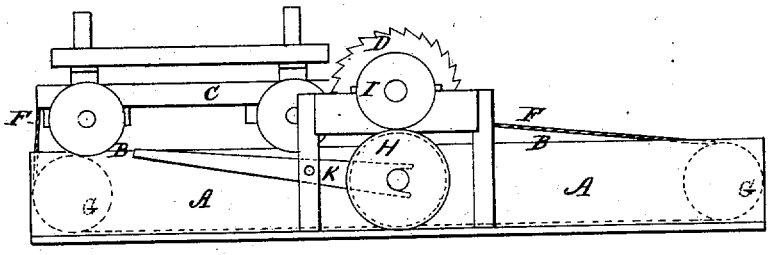

In the accompanying drawing, forming part of this specification, Figure 1 represents a plan view of my invention, and Fig. 2 a side elevation of the same.

A indicates the bed-frame, and B B the parallel rails upon which the log truck or carriage C moves to and fro past the saw D. The latter is mounted on a transverse shaft, E, having its bearings in the frame A. Motion is imparted to the carriage by means of the wire rope or chain F, whose ends are attached thereto in suitable manner. Said rope or chain is tightly wound one or more times about the drum or enlarged portion F′ of the transverse shaft E, and passes around the grooved sheaves G, located at the respective ends of the bed-frame A.

It is obvious from this arrangement that the carriage C may be moved on the ways B B by rotating the drum-shaft F′ E. In other words, a log placed on the carriage is fed to the saw by rotating the drum-shaft, thus winding one end of the rope or chain thereon as the other runs off.

As a means for imparting at will the required rotary motion to the saw-shaft E, I employ a plain-surfaced friction-pulley, H, which is mounted on a shaft directly beneath the friction-pulley I, fixed on the saw-shaft. The pulley H is raised and thus brought in contact with the pulley I by means of the pivoted lever K, whose forked end embraces the shaft, as shown. The friction between the surfaces of the pulleys causes the drum-shaft to rotate in the opposite direction to the saw-arbor, and thus advance the carriage to the saw.

The simplicity of my invention, the small number of parts, and the ease with which it can be operated, make it especially desirable in the manufacture of lumber.

Having thus described my invention, what I claim as new is—

In combination with the log-carriage of a saw-mill, the rotary drum, the rope or chain wound around said drum, the guide-sheaves, the friction-pulleys, and the lever, substantially as shown and described, for the purpose specified.

WILLARD LAMB.

Witnesses:

SUSAN WATSON,
H. J. WATSON.